US008458663B2

(12) United States Patent
Carteri et al.

(10) Patent No.: US 8,458,663 B2
(45) Date of Patent: Jun. 4, 2013

(54) STATIC CODE ANALYSIS

(75) Inventors: Francesco Maria Carteri, Rome (IT); Filomena Ferrara, Rome (IT); Roberto Menghini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1145 days.

(21) Appl. No.: 12/371,761

(22) Filed: Feb. 16, 2009

(65) Prior Publication Data

US 2009/0210854 A1  Aug. 20, 2009

(30) Foreign Application Priority Data

Feb. 14, 2008 (EP) .................................... 08151415

(51) Int. Cl.
*G06F 13/00* (2006.01)
*G06F 13/28* (2006.01)
*G06F 11/00* (2006.01)

(52) U.S. Cl.
USPC ........................................ 717/124; 714/38.14

(58) Field of Classification Search
USPC .......................................................... 717/124
See application file for complete search history.

(56) References Cited

U.S. PATENT DOCUMENTS

| | | | |
|---|---|---|---|
| 2002/0085696 A1* | 7/2002 | Martin et al. | 379/201.03 |
| 2005/0015675 A1* | 1/2005 | Kolawa et al. | 714/38 |
| 2007/0288885 A1* | 12/2007 | Brunel et al. | 717/104 |
| 2008/0046860 A1* | 2/2008 | Kratschmer et al. | 717/101 |
| 2009/0144698 A1* | 6/2009 | Fanning et al. | 717/120 |

OTHER PUBLICATIONS

Schilling, W.W.; Alam, M; "Work in Progress—Measuring the ROItimefor Static Analysis" Frontiers in Education, 2005. FIE apos; 05.Proceedings 35th Annual Conference; Oct. 19-22, 2005; p. F1G.
Zheng, Jiang; Williams, Laurie; Nagappan, Nachiappan; Snipes, Will; Hudepohl, John; Vouk, Mladen; Ngo, Kiem; "On the Effectiveness of Static Analysis Tools for Fault-Detection" 9 pages; 2005, Nortel Networks, Software Dependability and Design; Department of Computer Science, North Carolina State University; Raleigh, NC; USA.

* cited by examiner

Primary Examiner — Li B Zhen
Assistant Examiner — Arshia S Kia
(74) Attorney, Agent, or Firm — D'Ambrosio & Menon, PLLC

(57) ABSTRACT

Methods, computer program products and systems for determining whether to perform a static code analysis of a software product. In one embodiment of the method, the method for determining whether to perform a static code analysis depends on a number of variables including a developer's knowledge of the software product in question; a developer's knowledge of the language in which the software product is written: and the amount of time the developer has actually worked with the product. The individual and collective experience of members of a software development team may be determined to decide whether static code analysis needs to be performed on software written by the team.

23 Claims, 4 Drawing Sheets

| Product | $K_{team}$ | Static Analysis | Defects Found |
|---|---|---|---|
| $TEAM_1$ | 1.2 | Yes | 24000 |
| $TEAM_2$ | 1.8 | Yes | 1000 |
| $TEAM_3$ | 5 | No | 8 |

Fig. 2

STATIC CODE ANALYSIS

PRIORITY

This application is based on and claims the benefit of priority from European Patent Application EP08151415.0 filed Feb. 14, 2008.

BACKGROUND

Software programs may contain errors because the developers who write the underlying software code for the programs, make errors while writing the code. Thus, several rounds of writing, testing and modification may be required before a high-quality software product can be released.

SUMMARY

Static code analysis refers to an analysis of software code that is performed without actually executing the programs built from that code. There are a number of static code analysis tools available (e.g. Findbugs, Jtest and c++test), which differ according to the depth of the analysis and the languages on which they operate. In most cases, static code analysis involves a syntactic and/or semantic analysis of the source code (or the object code) of a software product. However, the sophistication of the analysis performed by static code analysis tools varies considerably: and can range from an analysis of the behaviour of individual statements and declarations within a piece of code, to an analysis of the complete source code of a program.

However, static code analysis is limited insofar as it only minimises coding errors that could become bugs. In particular, static code analysis cannot prove that code underlying a software product satisfies all of a user's requirements. Furthermore, static code analysis must comply with the software requirements of current evaluation methods and the limitations of current technology.

Nonetheless, static code analysis is being increasingly used in the verification of software used in safety-critical computer systems and in locating potentially vulnerable code. Cost savings and system reliability benefits may be obtained over the lifetime of the software by using static code analysis. Accordingly, many software companies automatically implement static code analysis as part of their software development processes.

In one embodiment of the invention, a method for determining whether to perform a static code analysis of a software product includes identifying one or more members of a team to develop the software product; determining a first measure of a knowledge the one or more members has of the software product: determining a second measure of a knowledge the one or more members has of a language in which the software product is to be developed: calculating a third measure of the team's collective knowledge of the software product and the language in which it is to be developed, from the first and second measures: comparing the third measure with a predefined threshold value representing a minimum knowledge level of the team, below which, static code analysis of the code developed by the team is mandated; deciding not to perform a static code analysis on the software product in the event the team's collective knowledge of the software product and the language in which it is to be developed, substantially exceeds the threshold value: and deciding to perform the static code analysis on the software product in the event the team's collective knowledge of the software product and the language in which it is to be developed is substantially less than or equal to the threshold value.

The embodiments of the invention provide a mechanism for objectively assessing the merits of performing a static code analysis on software code developed by a software development team. This enables a decision to be made as to whether a static code analysis is actually needed, rather than automatically performing the static code analysis as is traditionally done as part of a normal software development process. This in turn, allows for a reduction in the timeline and cost of software development projects wherein it is decided that static code analysis is not needed.

Implementations of the method discussed above may include a computer-implemented method, a system, or a computer program product. The details of one or more embodiments of the invention are set forth in the accompanying drawings and the description below. Other features of the invention will be apparent from the description and drawings, and from the claims.

BRIEF DESCRIPTION OF THE DRAWINGS

FIG. 2 is a table of results obtained from an exemplary implementation in one embodiment of the invention.

DETAILED DESCRIPTION

Figure 1:
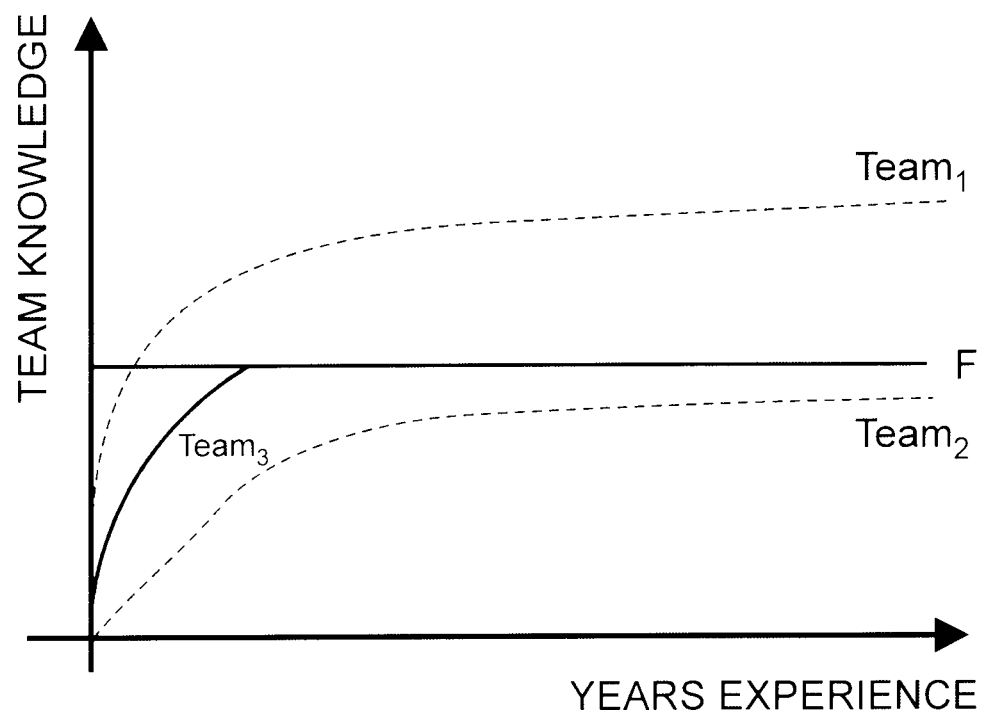
FIG. 1 is a graph of an exemplary decision region employed in one embodiment of the invention.

Exemplary methods, systems, and computer program products for determining whether to perform a static code analysis are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

In contrast with present approaches to software development and testing, which automatically apply static code analysis as part of software testing, the embodiments of the present invention assesses the relative costs and benefits of performing static code analysis, to determine whether the analysis is actually needed in a particular software development project.

The amount of time spent by an automated tool in performing static code analysis may represent only a small fraction of the time required to analyse the results therefrom. In particular, while a static code analysis tool may examine software code for a comparatively short period of time, this operation often produces large amounts of data that must be processed and analysed by highly skilled staff to determine the significance of the data.

In one embodiment of the invention, the process is executed as a news function within a planning tool (which enables a project manager to develop a schedule plan for the development of a software product). In use, when a project manager is aware that a new software product is to be developed, the project manager may create a new project plan (comprising a timeline, milestones and deliverables) for the development process, using a project planning tool. In doing so, the project manager may determine whether the timeline for the project is to be established with reference to a particular start or finish date. Having established this delimiter, the project manager may configure an overall project calendar against which tasks in the project will be scheduled. Traditional project planning tools for software development assume that static code analysis is to be performed as part of the development process. In one embodiment of the method for determining whether to perform a static code analysis, such an assumption may not be necessarily valid since the method may determine that static code analysis of a particular software product is not necessary. In this case, the timeline for the software development project may be modified to reflect the absence of a static code analysis phase. Accordingly, in one embodiment of the method for determining whether to perform a static code analysis, the method may be effectively integrated within a project management scheduling tool to develop the overall timeline for a software development project, which takes into account the outcome of a decision as to whether static code analysis needs to be performed on the software.

In one embodiment of the method, the method for determining whether to perform a static code analysis is based on the observation that the relative costs and benefits of performing static code analysis, depend on a number of variables including: a developer's knowledge of the software product in question (wherein the knowledge need not be obtained by working directly with the product, but may be obtained from attending conferences or learning how to install the product etc.): a developer's knowledge of the language in which the software product is written: and the amount of time the developer has actually worked with the product.

The individual and collective experience of members of a software development team may be reviewed or observed to determine whether static code analysis needs to be performed on software written by the team. In another embodiment, the method for determining whether to perform a static code analysis may be used to select members of a software development team depending on the need to avoid static code analysis of software developed by the team.

In the present example, an individual's knowledge of a given product or language is expressed by the number of years the person has worked with the product or language. However, it will be recognised that other indicators of knowledge (e.g. number of training courses attended, number of related languages or products on which the person has worked etc.) of a given product or language may also be employed by the embodiments of the invention.

A generic expression for the knowledge of an individual member of a software development team may be expressed by the variable $K_{ind}$. $K_{ind}$ is denoted by the function $K_{ind}=G(F_1(E_{prod}), F_2(E_{lang}))$, wherein $F_{prod}$ and $E_{lang}$ respectively represent the number of years experience the member has of the product and the language in question; and $F_1$ and $F_2$ represent any generic function of $E_{prod}$ and $E_{lang}$ respectively. In addition. G represents any generic function of $F_1$ and $F_2$.

The collective knowledge of the software development team may be denoted by the variable $K_{team}$ which is denoted by the function $K_{team}=H(K_{ind}(i). i=1 \text{ to } n)$, where n equals the number of members in the team. In the specific present example, the knowledge of an individual team-member is given by the expression $K_{ind}=E_{prod}+E_{lang}$. However, it will be appreciated that the knowledge of an individual member need not always be represented by a simple linear expression. In particular, non-linearities or other functions of $E_{prod}$ and $E_{lang}$ may also be included within this expression. Similarly, in the specific present example, the collective knowledge of the software development team may be represented by the expression $$K_{team} = \frac{\sum_{i=1}^{n} K_{ind}(i)}{n}.$$

As before, the collective knowledge of the team need not be represented in such a linear fashion. Indeed, other representations may be employed, which may, for example, include inter alia different weightings on the knowledge of individual team members according to their role within the team.

Using the above simple expression for the collective knowledge of a development team, if the value of $K_{team}$ exceeds a predefined threshold value F (whose value is established by the project manager), the team can produce software code without the need for static code analysis thereof. FIG. 1 is a graph showing the threshold F (for determining whether or not a static analysis need be performed) and a representation of the experience of individual team-members and collective knowledge of a team in respect of several different software development projects.

In another embodiment, the static code analysis question could be envisaged as a multi-variate problem which considers the relative contributions of different variables in determining whether or not static code analysis need be performed. More particularly, it would be possible to establish a region within a multivariate space within which a static code analysis need not be necessary.

FIG. 2 shows the results of some studies of the number of defects found in code developed by different software development teams. A threshold value of 3.0 was used to decide whether to perform static code analysis. In the case of a team(TEAM$_1$) which worked with a first product, the collective knowledge ($K_{team}$) of the team had a value of 1.2. Clearly this value is below the threshold for determining whether to perform static code analysis on the code developed by the team. This relative lack of experience in the team is reflected in the detection of 24,000 defects in the code developed thereby.

In the case of a team(TEAM$_2$) which worked with a second product, the collective knowledge ($K_{team}$) of the team had a slightly higher value of 1.8. As before, this would indicate that a static code analysis should be performed on code developed by the team. This is verified by the detection of 1000 errors in the code.

In contrast, in the case of a team(TEAM$_3$) which worked with a third product, the collective knowledge (K$_{team}$) of the team is considerably higher, and in particular, has a value of 5. This would suggest that a static code analysis need not be performed on software code developed by this team. This is verified by the detection of merely 8 defects in code developed by the team.

Figure 3:
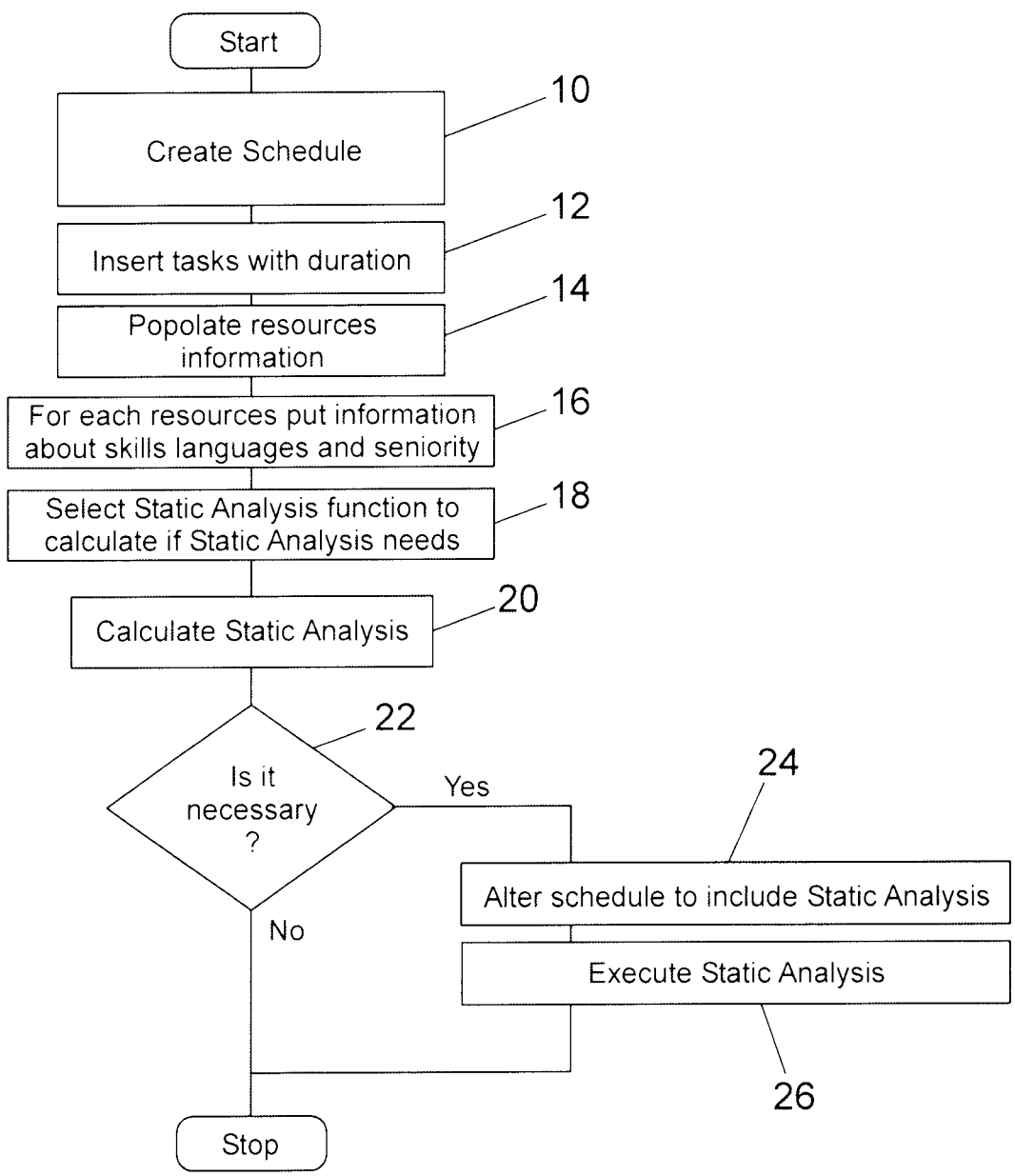
FIG. 3 is a flowchart of a method implemented in a project scheduling process in accordance with one embodiment of the invention.

Referring to FIG. 3, a project management tool which employs one embodiment of the method of the present invention comprises creating 10 a schedule for a software development project: determining 12 the tasks involved in implementing the project (and the duration of these tasks): determining 14 the resources and information required to perform the tasks; determining 16 the skills, languages and seniorities of individual members of a potential software development team for the software product; implementing 18 the method of the embodiment to calculate 20 the collective knowledge (K$_{team}$) of the proposed software development team: comparing 22 the value of the collective knowledge variable (K$_{team}$) against a predefined threshold (F): altering 24 the schedule for the software development project to include static code analysis in the event the calculated collective knowledge (K$_{team}$) of the team does not exceed the predefined threshold (F) 26: and executing 26 the static code analysis at an appropriate time within the project schedule.

Figure 4:
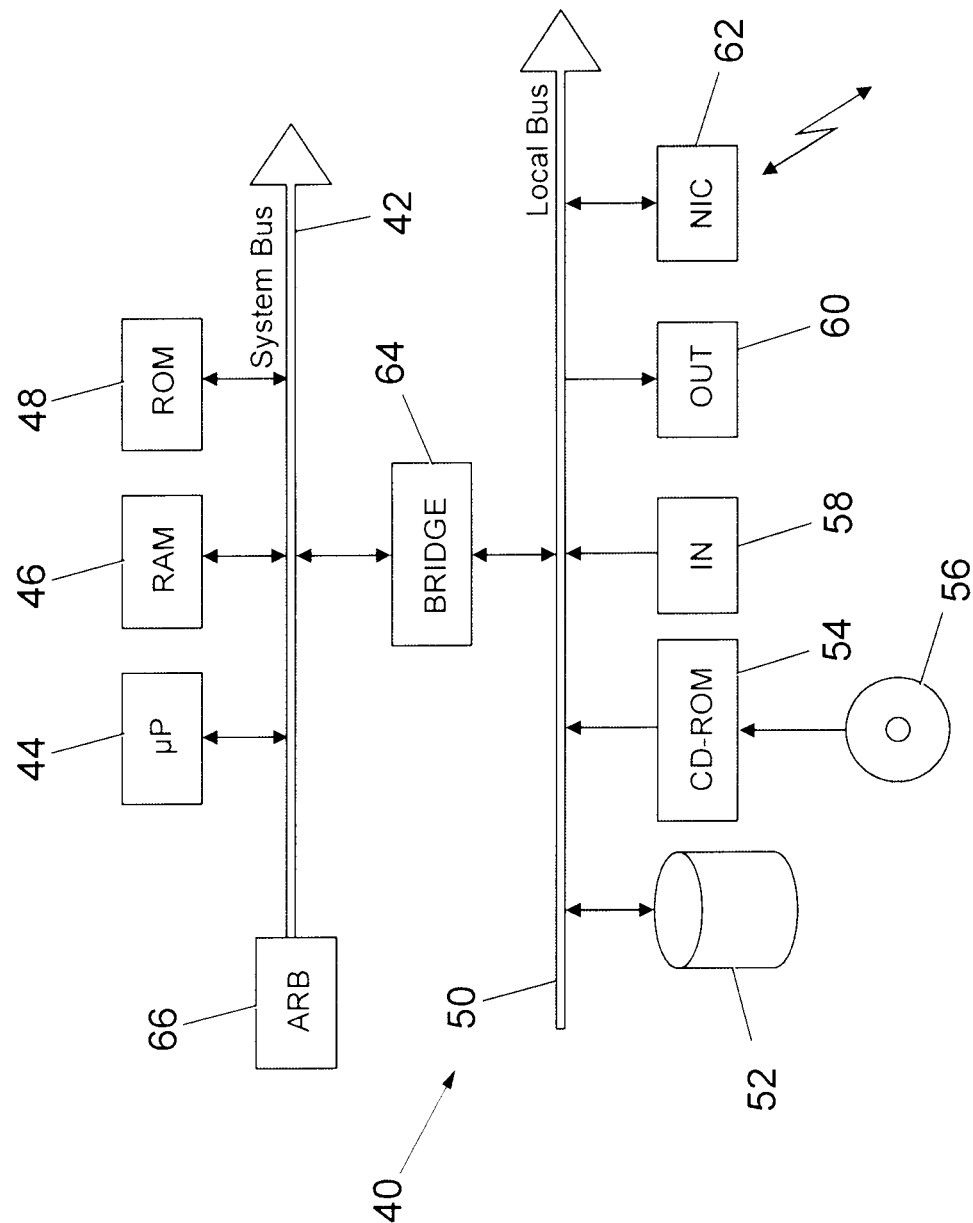
FIG. 4 is a block diagram of a computer system adapted to perform an embodiment of the invention.

A machine on which an embodiment of the invention operates has a structure shown in FIG. 4. A computer 40 is formed by several units that are connected in parallel to a system bus 42. In detail, one or more microprocessors 44 control operation of the computer 40: a RAM 46 is directly used as a working memory by the microprocessors 44, and a ROM 48 stores basic code for a bootstrap of the computer 40. Peripheral units are clustered around a local bus 50 (by means of respective interfaces). Particularly, a mass memory consists of a hard-disk 52 and a drive 54 for reading CD-ROMs 56. Moreover, the computer 40 includes input devices 58 (for example, a keyboard and a mouse), and output devices 60 (for example, a monitor and a printer). A Network Interface Card (NIC) 62 is used to connect the computer 40 to the network. A bridge unit 64 interfaces the system bus 42 with the local bus 50. Each microprocessor 44 and the bridge unit 64 can operate as master agents requesting an access to the system bus 42 for transmitting information. An arbiter 66 manages the granting of the access with mutual exclusion to the system bus 42.

It should also be understood that the inventive concepts disclosed herein are capable of many modifications. To the extent such modifications fall within the scope of the appended claims and their equivalents, they are intended to be covered by this patent.

The invention claimed is:

1. A method performed by a computing system for integrating a system for determining whether to perform a static code analysis with a project management scheduling tool, comprising:
    selecting one or more members of a team to develop a software product, the one or more members selected depending on a need to avoid performing the static code analysis on the software product developed by the team;
    determining a first measure indicative of a knowledge the one or more members has of the software product;
    determining a second measure indicative of a knowledge the one or more members has of a language in which the software product is to be developed;
    calculating a third measure indicative of the team's collective knowledge of the software product and the language in which it is to be developed, from the first and second measures;
    comparing the third measure with a predefined threshold value representing a minimum knowledge level of the team, below which, the static code analysis on the software product developed by the team is mandated; and
    deciding not to perform the static code analysis on the software product if the team's collective knowledge of the software product and the language in which it is to be developed exceeds the threshold value.

2. The method of claim 1, further comprising deciding to perform the static code analysis on the software product if the team's collective knowledge of the software product and the language in which it is to be developed is less than or equal to the threshold value.

3. The method of claim 1, wherein the determination of a first measure of the knowledge the one or more members has of the software product comprises determining the number of years the one or more members has worked with the software product.

4. The method of claim 1, wherein the determination of a second measure of the knowledge the one or more members has of the language in which the software product is to be developed further comprises determining the number of years each member has programmed in the language.

5. The method of claim 1, wherein the calculation of a third measure of the team's collective knowledge of the software product and the language in which it is to be developed further comprises calculating the third measure as an average of the first and second measures from all of the members of the team.

6. The method of claim 1, further comprising allowing a user to define the threshold value.

7. The method of claim 1, wherein the decision not to perform the static code analysis comprises:
    ascribing a probability value to the team, if the team's collective knowledge of the software product and the language in which it is to be developed exceeds the threshold value, wherein the probability value is inversely related to the team's collective knowledge of the software product and the language in which it is to be developed exceeds the threshold value; and
    deciding to perform the static code analysis on the software product in accordance with the probability value accorded to the team, such that the static code analysis is less likely to be performed with increased collective knowledge of the team, above the threshold value.

8. The method of claim 1, further comprising creating an overall timeline for a software development project.

9. A system for determining whether to perform a static code analysis comprising:
    a processor; and
    a computer memory operatively coupled to the processor;
    wherein the computer memory has disposed within it:
    computer program instructions for selecting one or more members of a team to develop a software product, the one or more members selected depending on a need to avoid performing the static code analysis on the software product developed by the team;
    computer program instructions for determining a first measure indicative of a knowledge the one or more members has of the software product;

computer program instructions for determining a second measure indicative of a knowledge the one or more members has of a language in which the software product is to be developed;

computer program instructions for calculating a third measure indicative of the team's collective knowledge of the software product and the language in which it is to be developed, from the first and second measures;

computer program instructions for comparing the third measure with a predefined threshold value representing a minimum knowledge level of the team, below which, the static code analysis on the software product developed by the team is mandated; and computer program instructions for deciding not to perform the static code analysis on the software product if the team's collective knowledge of the software product and the language in which it is to be developed, exceeds the threshold value.

10. The system of claim 9, further comprising computer program instructions for deciding to perform the static code analysis on the software product if the team's collective knowledge of the software product and the language in which it is to be developed is less than or equal to the threshold value.

11. The system of claim 9, wherein the computer program instructions for determination of a first measure of the knowledge the one or more members has of the software product, further comprises computer program instructions for determining the number of years the one or more members has worked with the software product.

12. The system of claim 9, wherein the computer program instructions for the determination of a second measure of the knowledge the one or more members has of the language in which the software product is to be developed, further comprises computer program instructions for determining the number of years each member has programmed in the language.

13. The system of claim 9, wherein the computer program instructions for the calculation of a third measure of the team's collective knowledge of the software product and the language in which it is to be developed, further comprises computer program instructions for calculating the third measure as an average of the first and second measures from all of the members of the team.

14. The system of claim 9, further comprising computer program instructions for defining the threshold value.

15. The system of claim 9, wherein the computer program instructions for the decision not to perform the static code analysis comprises:

computer program instructions for ascribing a probability value to the team, if the team's collective knowledge of the software product and the language in which it is to be developed exceeds the threshold value, wherein the probability value is inversely related to the team's collective knowledge of the software product and the language in which it is to be developed exceeds the threshold value; and computer program instructions for deciding to perform the static code analysis on the software product in accordance with the probability value accorded to the team, such that the static code analysis is less likely to be performed with increased collective knowledge of the team, above the threshold value.

16. A computer program product for determining whether to perform a static code analysis, the computer program product comprising:

a non-transitory computer-usable medium including:

computer program instructions for selecting one or more members of a team to develop a software product, the one or more members selected depending on a need to avoid performing the static code analysis on the software product developed by the team;

computer program instructions for determining a first measure indicative of a knowledge the one or more members has of the software product;

computer program instructions for determining a second measure indicative of a knowledge the one or more members has of a language in which the software product is to be developed;

computer program instructions for calculating a third measure indicative of the team's collective knowledge of the software product and the language in which it is to be developed, from the first and second measures;

computer program instructions for comparing the third measure with a predefined threshold value representing a minimum knowledge level of the team, below which, the static code analysis on the software product developed by the team is mandated; and computer program instructions for deciding not to perform the static code analysis on the software product if the team's collective knowledge of the software product and the language in which it is to be developed exceeds the threshold value.

17. The computer program product of claim 16, further comprising computer program instructions for deciding to perform the static code analysis on the software product if the team's collective knowledge of the software product and the language in which it is to be developed is less than or equal to the threshold value.

18. The computer program product of claim 16, wherein the computer program instructions for determination of a first measure of the knowledge the one or more members has of the software product further comprises computer program instructions for determining the number of years the one or more members has worked with the software product.

19. The computer program product of claim 16, wherein the computer program instructions for the determination of a second measure of the knowledge the one or more members has of the language in which the software product is to be developed, further comprises computer program instructions for determining the number of years each member has programmed in the language.

20. The computer program product of claim 16, wherein the computer program instructions for the calculation of a third measure of the team's collective knowledge of the software product and the language in which it is to be developed, further comprises computer program instructions for calculating the third measure as an average of the first and second measures from all of the members of the team.

21. The computer program product of claim 16, further comprising computer program instructions for defining the threshold value.

22. The computer program product of claim 16, wherein the computer program instructions for the decision not to perform the static code analysis comprises:

computer program instructions for ascribing a probability value to the team, if the team's collective knowledge of the software product and the language in which it is to be developed exceeds the threshold value, wherein the probability value is inversely related to the team's collective knowledge of the software product and the language in which it is to be developed exceeds the threshold value; and computer program instructions for deciding to perform the static code analysis on the software product in accordance with the probability value accorded to the team, such that the static code analysis is less likely to be performed with increased collective knowledge of the team, above the threshold value.

23. The computer program product of claim 16, further comprising computer program instructions for integration within a project management scheduling tool to create an overall timeline for a software development project.

* * * * *